June 11, 1929. A. MOORHOUSE ET AL 1,716,651
PIPE ORGAN
Filed Feb. 7, 1928 7 Sheets-Sheet 5
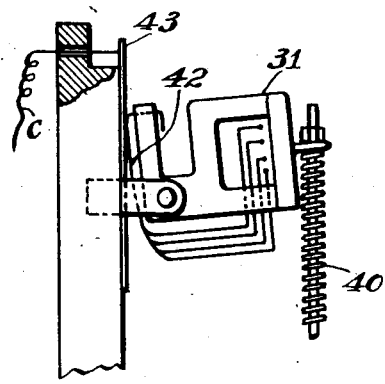
Fig. VI.
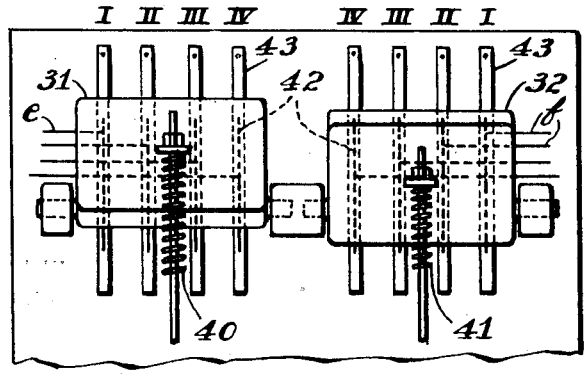
Fig. VII.
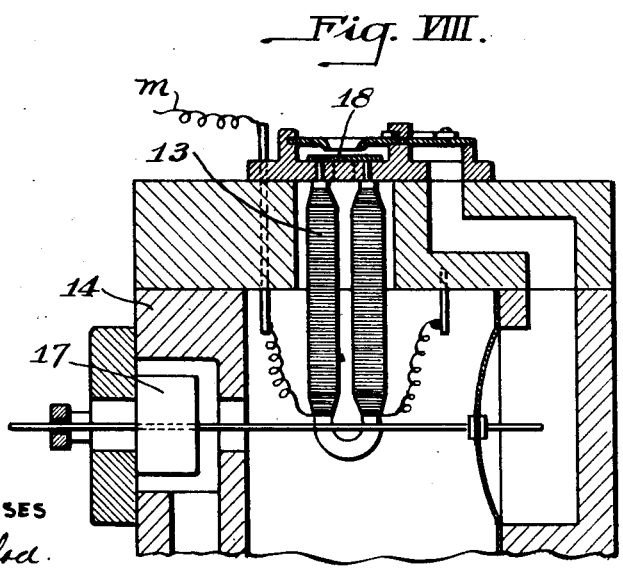
Fig. VIII.

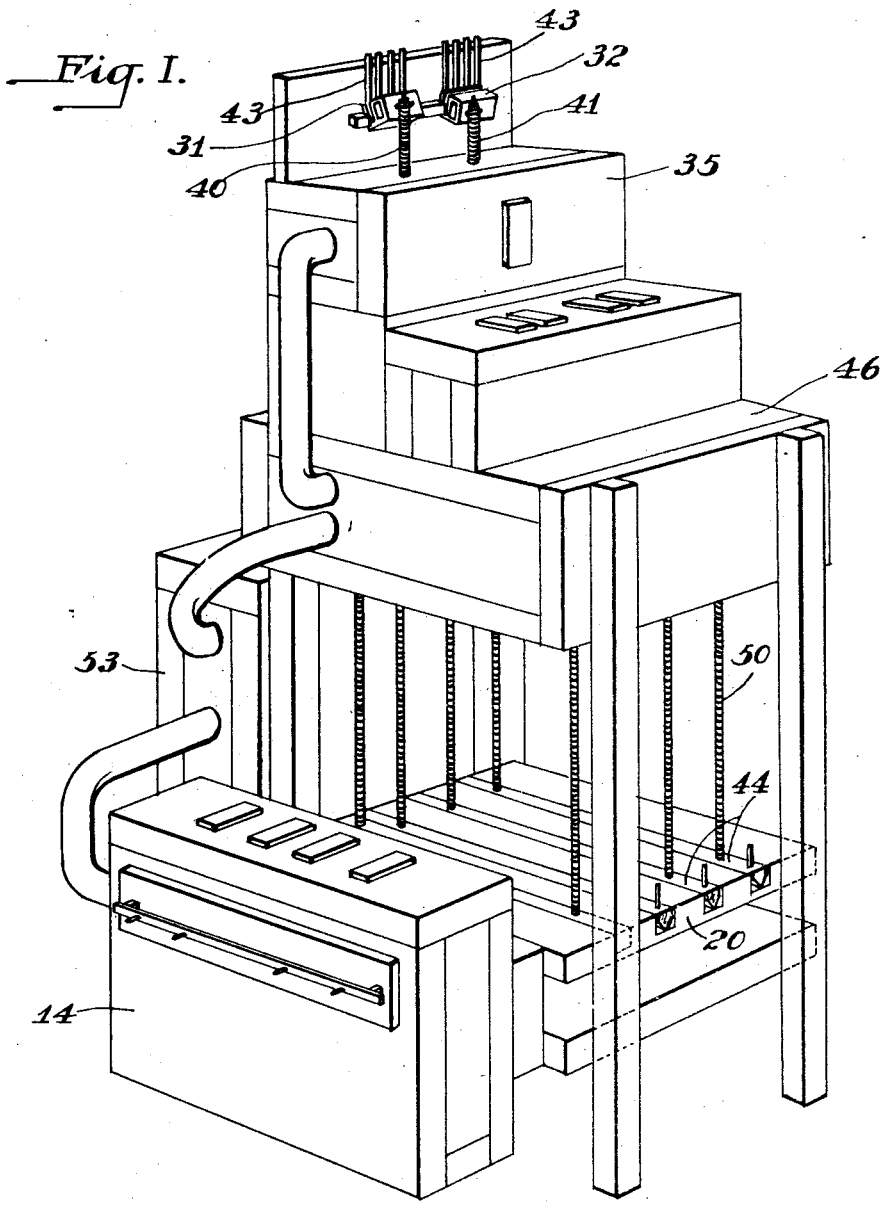
Fig. I.

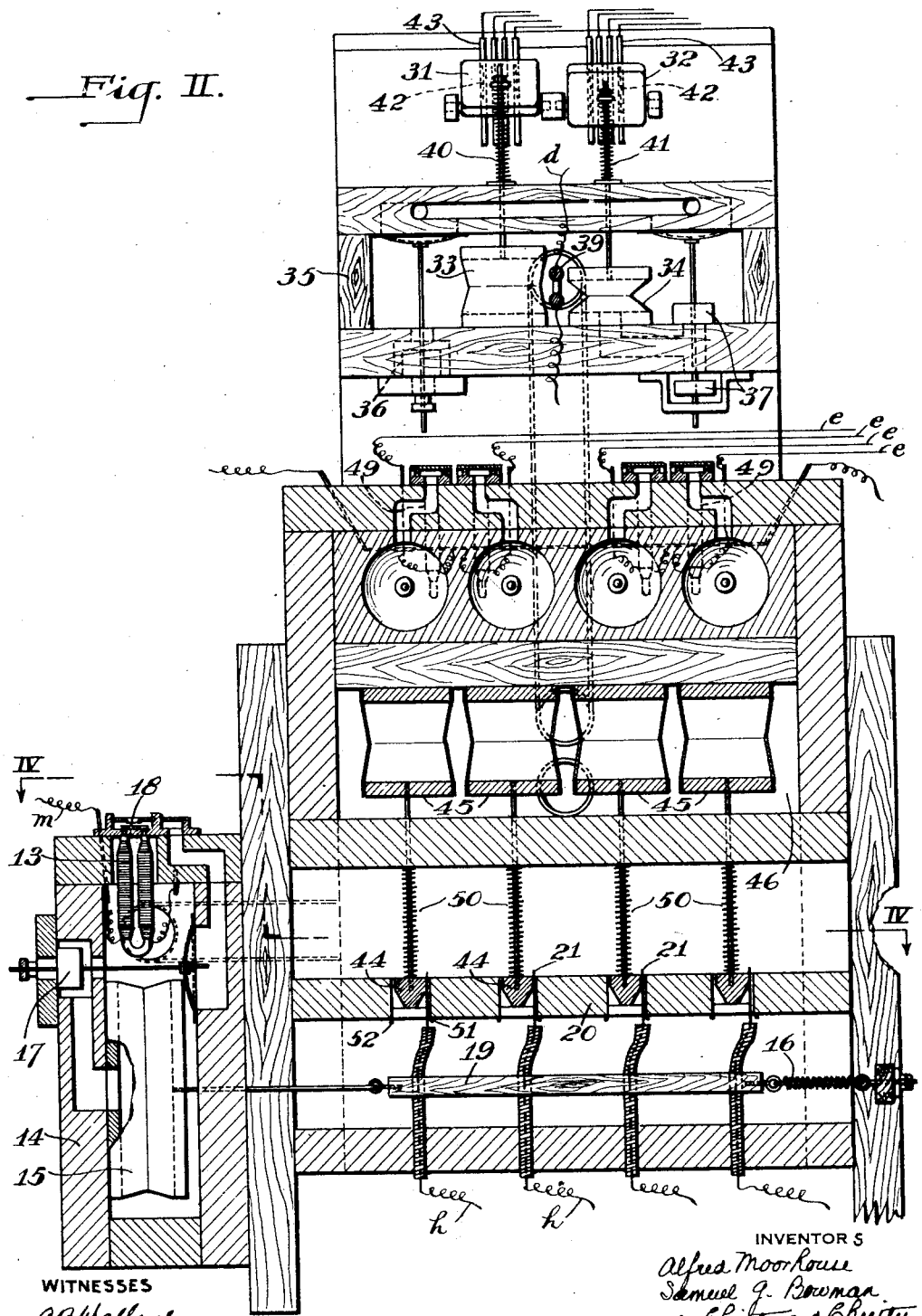

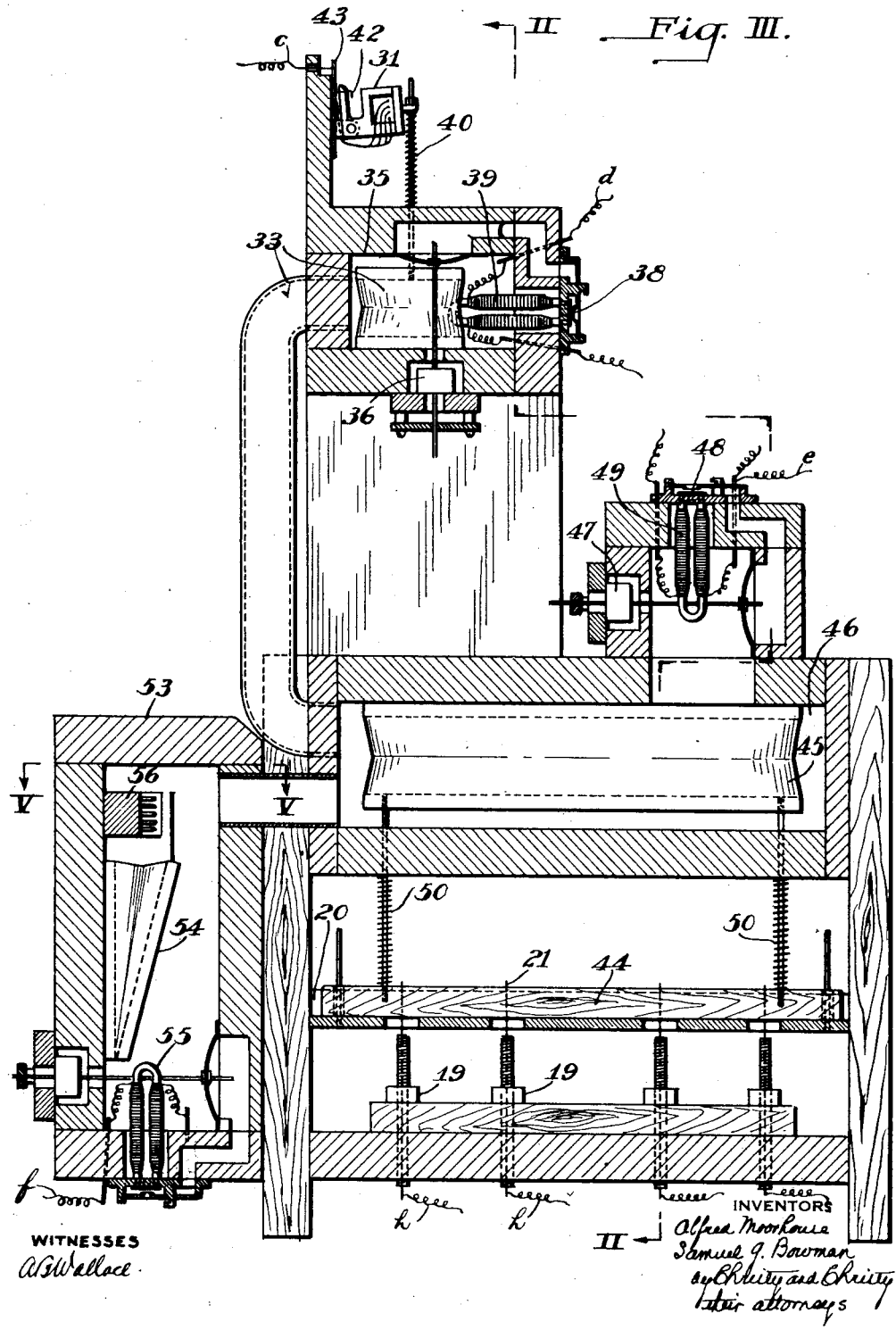

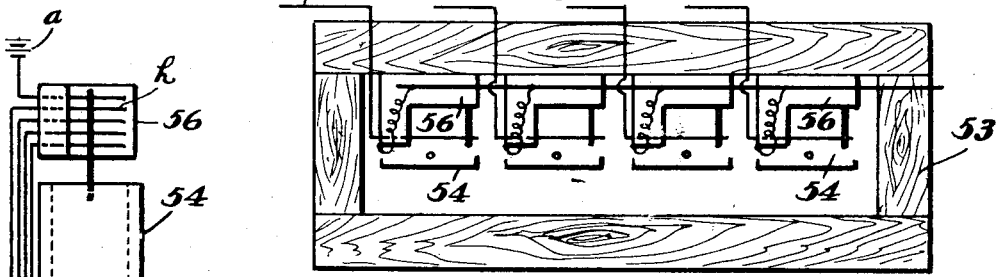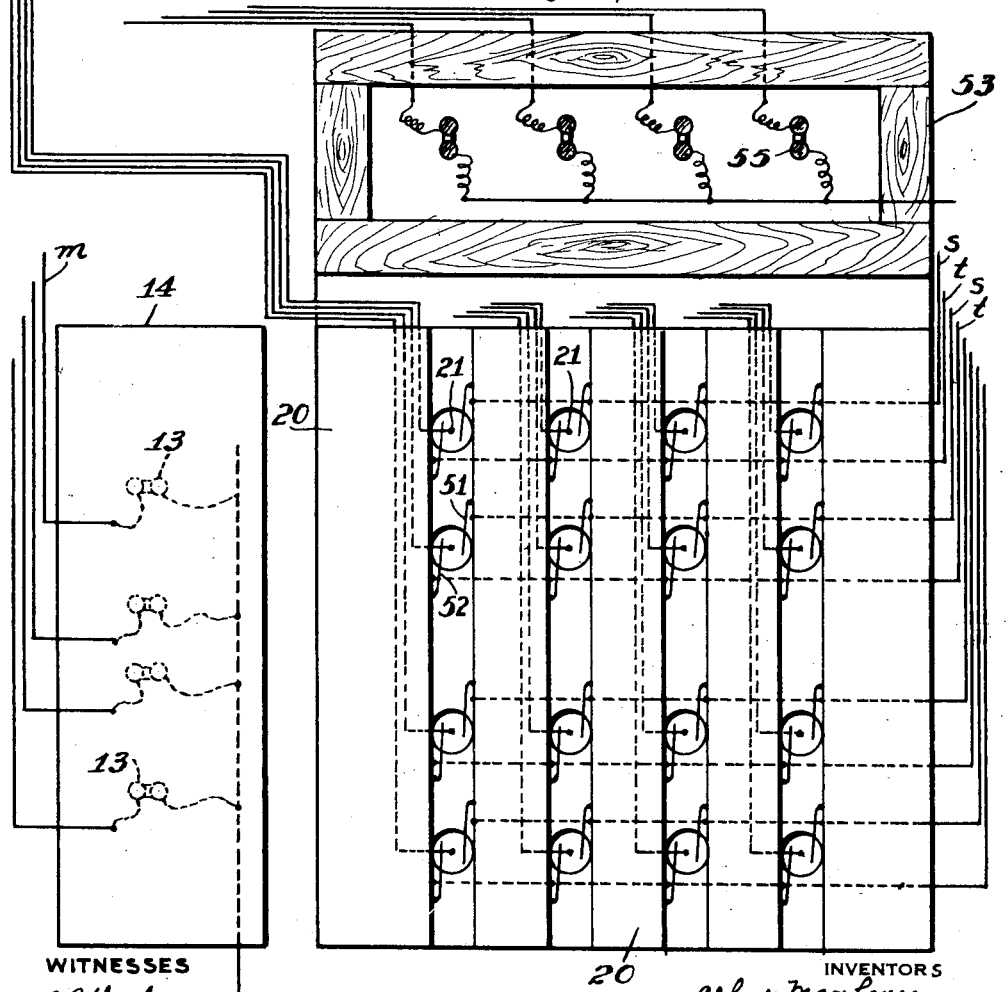

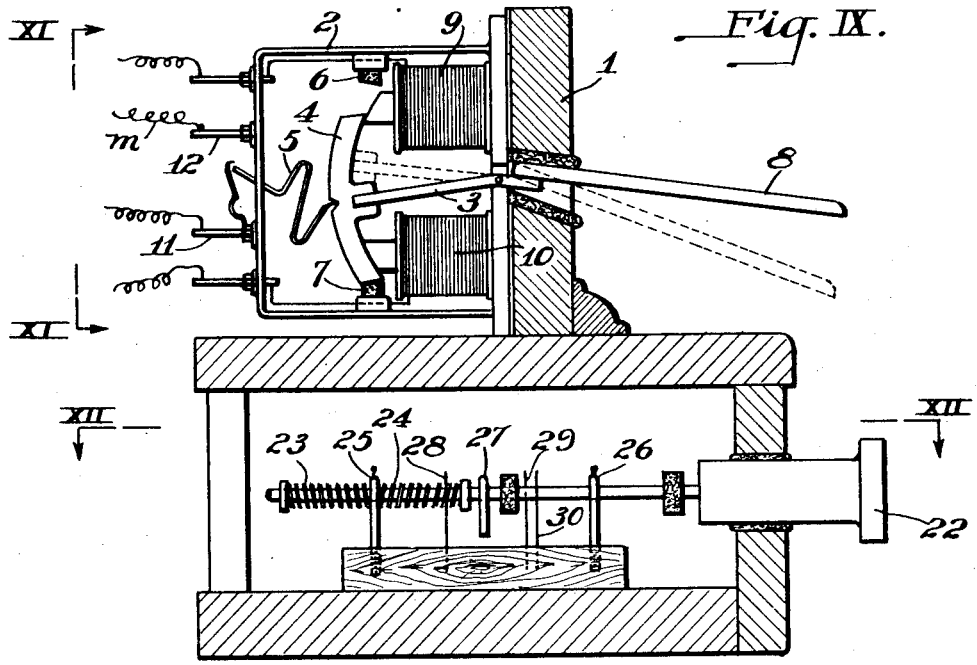
Fig. IX.
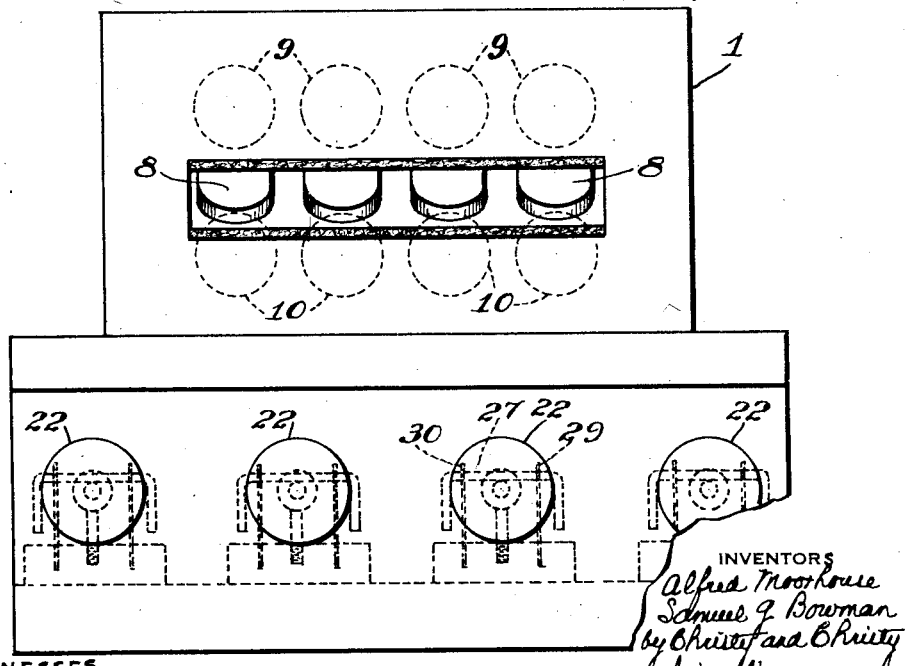
Fig. X.

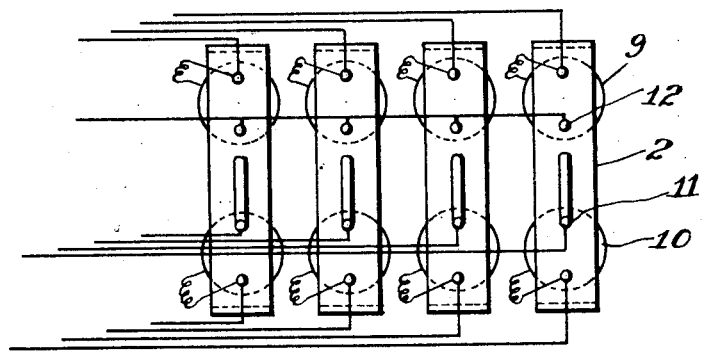
Fig. XI.
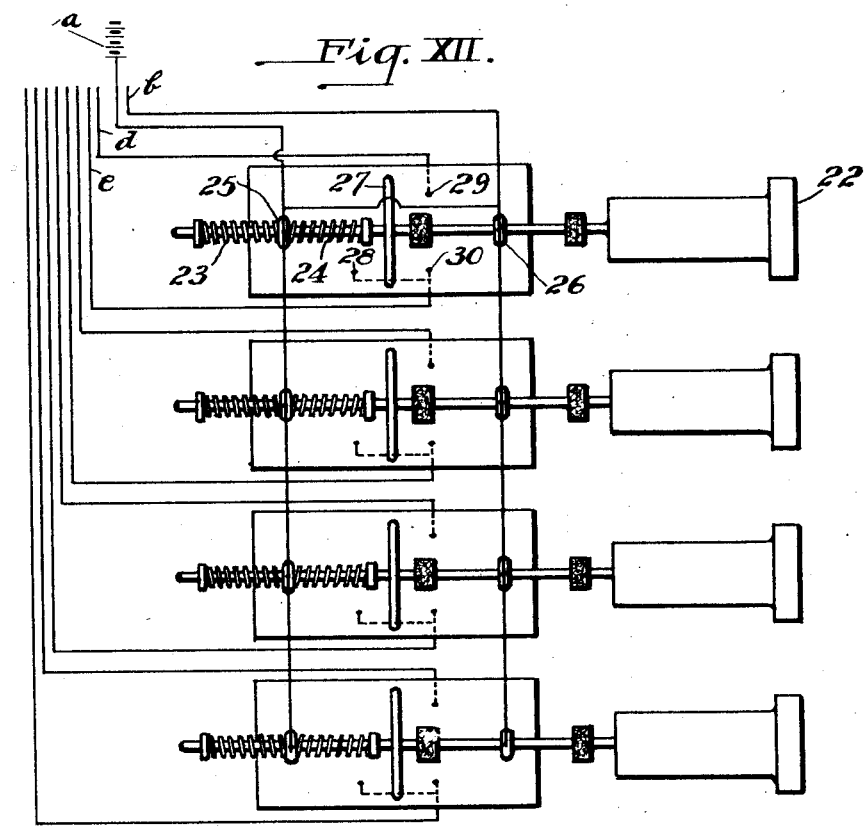
Fig. XII.

Patented June 11, 1929.

1,716,651

UNITED STATES PATENT OFFICE.

ALFRED MOORHOUSE AND SAMUEL G. BOWMAN, OF PITTSBURGH, PENNSYLVANIA.

PIPE ORGAN.

Application filed February 7, 1928. Serial No. 252,455.

This invention relates to combination stops for pipe organs, and specifically to means for setting up any number of combinations (within the limitations of the particular apparatus), so that the organist may as he plays give such permanence to any combination he may have produced, that, continuing in his playing to shift the stops, he may still, by the shifting of a combination stop, restore that particular combination.

The accompanying drawings illustrate the invention. Fig. I is a view in perspective of apparatus which, associated with other apparatus set in position adjacent to the manual of an organ, embodies the invention. Fig. II is a view in vertical and longitudinal section, and Fig. III is a view in vertical and transverse section, of the apparatus of Fig. I. The plane of section of Fig. II is a broken plane, indicated by the line II—II, Fig. III. Fig. IV is a diagrammatic view in horizontal section, on the plane indicated at IV—IV, Fig. II. Fig. V is a fragmentary view in horizontal section, on the plane indicated at V—V, Fig. III. Fig. VI is a fragmentary view in vertical section, and Fig. VII a view in elevation, illustrating to larger scale and with greater particularity a detail of the apparatus as seen in Figs. III and II. Fig. VIII is a view in vertical section, illustrating to larger scale and with greater particularity another detail of the apparatus which in Fig. II is shown in vertical section. Fig. IX is a view in vertical and transverse section through the tablet board of an organ, equipped with apparatus which, cooperating with the apparatus illustrated in the earlier figures, constitutes an embodiment of the invention. Fig. X is a view in front elevation of the tablet board of Fig. IX. Fig. XI is a diagrammatic view in rear elevation of a portion of the apparatus shown in Fig. IX, and the field of view is in Fig. IX indicated by the bracket XI—XI. Fig. XII is a diagrammatic view in horizontal section, on the plane indicated by the line XII—XII, Fig. IX.

Referring, first, to Figs. IX-XII of the drawings, upon the back of the tablet board 1 of the organ (which, as will be understood, is located adjacent the key-board) is mounted a succession of rectangular metal frames 2. These frames are electrically insulated in such mounting and stand apart one from another. In each frame on one side is pivoted a metallic bar 3 which terminates in an arc-shaped cross-arm 4 of iron. The center of curvature of the arc coincides with the center of pivoting of the bar. In each frame on the opposite side is pivoted a leaf spring 5, of copper or of other suitable resilient and conducting material. The spring at its end engages a notch in the cross-arm 4, and the arrangement is such and the strength of the spring is such, that, as the bar 3 is swung (vertically, as seen in Fig. IX) across the dead center between the two pivot points, spring tension is exerted, tending to swing the bar 3 upward or downward, as the case may be, and to hold it firmly and surely in abutment upon either the insulating cushion 6 above or the insulating cushion 7 below, which two cushions are carried securely upon the frame.

Means are provided for swinging bar 3, both manually and directly, and mechanically and indirectly. In order that the organist may swing the bar 3 manually and directly, the bar is prolonged through a slot in the tablet board 1, and there presents to the organist an extension 8 which conveniently will be of insulating material, ivory or a substitute for ivory. The means for swinging the bar 3 mechanically and indirectly are found in electro-magnets 9 and 10, mounted within the frame, with respect to both of which the cross-arm 4 serves in turn as an armature.

The spring 5 protruding at its further end beyond the frame, as Fig. IX shows, is adapted to make and break electrical contact with a pole-piece 11 borne by, though insulated from, frame 2.

Fig. IX shows in full lines the bar 3 in its lower position, the cross-arm 4 held under slight but sufficient spring tension upon cushion 7. In this position the make-and-break device is open. When, either under the hand of the organist or by the energizing of electro-magnet 9, the bar 3 is swung upward to the dotted-line position, the make-and-break device is closed. A circuit $m$ is then completed through the frame 2 and through the pole piece 12 borne by and electrically united with the frame. The circuit $m$ so completed through binding posts 11 and 12 is effective, by known instrumentalities, to bring into operation a particular set of organ pipes. The word stop is used in two senses: in one sense it signifies the bar 3 or its extension 8, or equivalent manually driven element; in the other sense it signifies that portion of the organ, that aggregate of pipes, which is responsive to and comes into operation under the control of the element 3. Specifically, to speak of the "vox humana" stop may be to speak of one of the bars 3, or of its extension 8, or it may be to speak of the set of pipes whose operation that bar controls. And whether the word be used with one meaning or the other, will depend upon the connection in which it is used. Each bar 3 with its extension 8 is a stop, and those sets of pipes which severally are under the control of the bars 3 are the stops. When the organist depresses an extension 8 from the full-line position of Fig. IX to the dotted-line position, he brings the corresponding portion of the organ into playing condition, so that as the keys subsequently are pressed, the corresponding pipes within that portion of the organ speak.

Referring to Figs. I-VIII, and particularly to Figs. II and VIII, when a bar 3 is shifted upward and a circuit $m$ is closed through two pole pieces 11 and 12, an electro-magnet 13 arranged in the circuit is energized. This electro-magnet is one of a series arranged within a common wind box 14.

The wind box 14 is a chamber with airtight walls filled with air under pressure. Within the wind box 14 is arranged a series of bellows 15, corresponding in number to the bars 3 on the tablet board. Each bellows is connected to a longitudinally shiftable rod 19 and normally is held by the tension of a spring 16 in expanded condition. From the bellows a passageway leads to a valve chest with opposite openings leading, one of them to the open air, the other to the interior of the wind box, and within the valve chest is arranged a valve 17 which alternately closes one or the other of such opposite openings, leaving the other free. Figs. II and VIII show the valve in the position of closure upon the opening which leads to the open air, and the bellows in free communication with the wind box. When valve 17 is in this position, the movable head of the bellows is subject to like pressure conditions on its two sides, and, such being the case, the spring 16 is effective to hold the bellows in the expanded condition shown in Fig. II.

The valve 17 is mounted on a stem, which stem is additionally secured to a flexible diaphragm 18. The diaphragm 18 forms part of the wall of the wind box chamber. The diaphragm chamber, or space on the opposite and outer side of the diaphragm, communicates through a passageway with a valve chest from which opposite openings lead, one to the open air, the other to the interior of the wind box. Within this second valve chest is arranged a second valve 18. The parts are so proportioned that the valve, which conveniently is disk-shaped and consists of a plate of iron faced on its upper side with such elastic sealing substance as a layer of felt or fibre of fine texture, has little or no lateral play. It has vertical play through a narrow interval, to close alternately one or the other of the opposite openings in the last mentioned valve chest. The disk 18 constitutes an armature for the electro-magnet 13.

The rod 19 carried by bellows 15 is arranged beneath a slotted board 20. The rod carries flexible and elastic contact pieces 21 which rise, one through each of the slots. Comparing Figs. II, III, and IV, it will be remarked that in this instance four bars 19 are provided, one for each bar 3, arranged in parallelism, and that the slots in board 20 extend transversely of the length of the bars. It will further be remarked that the number of slots is in this instance four and that each bar 19 is provided correspondingly with four flexible contact pieces 21. There is no necessary correspondence between the number of bars 19 and the number of slots in board 20. Bars 44, conveniently downwardly tapering in shape, move vertically, descending into and rising from the slots in board 20.

When the parts are inactive, and when electro-magnet 13 is not energized, pressure within wind box 14 drives disk 18 upward and holds it in position of closure upon the opening to the open air. The diaphragm chamber then is in open communication with the interior of the wind box; pressures upon opposite sides of the diaphragm are equal; and, valve 17 also being held by pneumatic pressure to position of closure upon its opening to the open air, the spring 16 is effective, as has been said, to distend the bellows 15 and to hold them distended. When a stop 8 is depressed, bringing into operative condition a particular set of pipes, a corresponding electro-magnet 13 within the wind box 14 is energized, its armature 18 is attracted and the corresponding diaphragm chamber, no longer in communication with the wind box, is then vented to the open air. The corresponding valve 17 is shifted, the corresponding bellows 15, vented to the air, is collapsed, and the corresponding bar 19 is shifted against spring tension from right to left, Fig. II.

Referring again to Figs. IX-XII, a set of longitudinally movable plungers or "combination stops" 22 is mounted within the reach of the organist. The number of these combination stops may be as many as the builder will; but to them the slots in board 20 and the elastic contact pieces 21 borne by the several bars 19 correspond in number. As here shown, the number is four.

Each combination stop is held normally by springs 23 and 24 in position shown in Figs. IX and XII, and from this normal position it may be shifted by the organist longitudinally, either in or out. When released, it returns under spring tension to the normal position shown. The shank of the combination stop is metallic and it extends through and is guided by metallic rings 25 and 26, and these rings pair by pair are included in a line $a\,b$ of electric flow, in which line, it will be understood a suitable source of electric energy is included. The shank of the stop carries a contact bar 27, and adjacently on one side is set the flexible pole piece 28, and on the other side the successively stationed flexible pole pieces 29 and 30. When the organist presses the combination stop inward, shifting it from right to left, he brings bar 27 to contact with pole piece 28 and brings a line $c$ into closed circuit with the source of electric energy; when he pulls the stop and shifts it from left to right he brings bar 27 to contact first with pole piece 29 and then additionally with pole piece 30, and first brings a line $d$ into circuit, and then additionally the line $c$ into circuit with the source of energy. When he releases the stop, it returns to normal position, and the circuits are broken.

Figs. II, III, VI and VII illustrate a switch which consists of two pivoted bodies 31 and 32 and operating mechanism. Two springs 40 and 41 tend to hold these two bodies in the elevated position illustrated in Fig. III, and from such position they are in alternation swung downward against spring tension by the collapse of the bellows 33 and 34. The bellows are arranged both of them within a wind box 35. Cooperating with each bellows is a diaphragm and a valve, such in character as that already described; but, while the valve 36 associated with bellows 33 is arranged within its valve chest, the valve 37 associated with bellows 34 is double and closes oppositely, to cut off communication between wind box and bellows and between bellows and the open air. The two diaphragm chambers intercommunicate, as appears in Fig. II. A valve 38 under the control of an electromagnet 39, such as that already described, determines the shifting of the switch.

Normally, as shown in Fig. II, electromagnet 39 is not energized; bellows 34, vented to the air, is collapsed; bellows 33, in communication with the wind box and under the tension of spring 40, is expanded. When electro-magnet 39 is energized, valve 38 uncovers the vent port, the two diaphragms move upward, and the two valves assume their alternate positions. Bellows 33 then, vented to the air, collapses, and swings body 31 downward, while bellows 34, in communication with the wind box, expands. Its expansion is aided and the upward swing of body 32 is effected by the tension of spring 41.

Each of blocks 31 and 32 carries a plurality of resilient contact pieces 42, conveniently loops of wire, corresponding in number to the bars 3, and these contact pieces, as the bodies 31 and 32 swing, alternately make and break contact with a corresponding set of contact pieces 43. These make-and-break devices are arranged in the lines $c$ associated with the several combination stops 22. The contact pieces 43 of the two groups are interconnected in pairs, as indicated by the Roman numerals, Fig. VII; and as the bodies 31 and 32 stand in their alternate positions, the line of electric circuit is established either through one of the leads $e$ on the left (Fig. VII) or through one of the leads $f$ on the right.

Figs. II and III show the bars 44 in position on the slots in board 20. These bars 44 are carried on rods which extend downward from a set of bellows 45, arranged within a wind box 46. Communication from within each bellows 45 alternately with the open air and with the interior of the wind box, is under control of such a diaphragm-controlled valve 47, as that already described, and for each diaphragm a control valve 48 operated by an electro-magnet 49, all such as already described, is provided. Springs 50 tend to expand the bellows 45 and to hold the bars 44 in the slots in board 20.

A wind box 53, Figs. I, III, and V, contains a series of bellows 54, corresponding in number to the combination stops 22, and these bellows, normally expanded under spring tension are, on the energizing of a corresponding series of electro-magnets 55, through such means as those already described, individually collapsed. The collapse of one of the bellows effects the closing of a corresponding switch 56. The expansion of the bellows opens the switch again.

Within each slot in board 20 are sets of elastic make-and-break devices, those on one side arranged each in one of the circuits $s$ in which one of the electro-magnets 9 (Fig. IX) is included, those on the other side arranged each in a circuit $t$ in which one of the electro-magnets 10 is included. Each bar 44 in its descent not only closes the make-and-break devices, but it brings into closed circuit with the make-and-break devices on one side or the other, those of the flexible and elastic contact pieces 21 which rise within that slot. When a bar 44 rises from the corresponding slot the elastic members which it has held to contact spring apart.

Each of the four leads $f$ on the right (Fig. VII) of the reversing device is in continuous circuit with one of the electro-magnets 55, and each of the four leads e on the left of the reversing device is in continuous circuit with one of the electro-magnets 49. When a switch 56 is closed a lead $g$ is brought into continuous circuit with four leads $h$, each of which (as is indicated in Figs. III and IV) is in continuous circuit with one of the four flexible and elastic contact pieces 21 with which each of the bars 19 is equipped. In circuit through the lead $g$ is arranged a suitable source of electric energy.

The wind boxes 14, 35, 46, and 53 are in Fig. I shown to be interconnected, and it will be understood that during operation they are filled with air under pressure.

The organist in playing brings into operation one set of pipes and another by swinging one and another of the stops 8. When for a particular passage of music he has so brought into operation a desired combination of sets of pipes, he may by the instrumentalities shown and described preserve it and, when the time comes, restore it again. With the swinging of each stop 8 a corresponding bar 19 (Fig. II) has been shifted from right to left. Having a given combination of stops in operation, the organist pulls out one of the combination stops 22— any one he will—and releases it again. He will not of course pull out one which he already has in service for preserving another combination. When he pulls out the combination stop 22, he brings its contact bar 27 into contact with flexible pole piece 28 and brings the lead $c$ of that particular combination stop into circuit with a source of electric energy. At the time, the switch apparatus is in the position shown in Fig. II. An electric circuit then is established through the corresponding make-and-break device 42, 43, through the corresponding lead $e$ on the left (Fig. VII), and through the corresponding electro-magnet 49. The magnet is energized and the corresponding bar 44 is elevated. When the organist releases the combination stop again, as immediately he does, the combination stop returns under spring tension to its normal inactive position, the electrical contacts then are broken again, and the bar 44 which has been elevated descends again, under the tension of spring 50.

The bar 44 when it rises, rises clear of the upper ends of the flexible and elastic contact pieces 21, and when the contact pieces which extend upward through this particular slot are so left free, so many of them as are borne by bars 19 which have been shifted from normal position to the left (Fig. II), swing to the left hand side of the slot. Then the descending bar 44 captures the contact pieces and holds them each in electric contact with either a make-and-break device 51 on one side of the slot or with a make-and-break device 52 on the other side. In its descent the bar 44 also closes these make-and-break devices. The organist will then continue to play upon the organ, making changes in stops as he will.

When thereafter he desires to restore the particular combination which in the manner described he has preserved with a particular combination stop, he presses that combination stop in and releases it again. In pressing the stop in he first brings the lead $d$ into circuit with a source of electrical energy, and then, immediately thereafter, lead $c$ as well. When he releases the combination stop again, it returns to neutral position, opening both circuits again. The closing of a circuit through lead $d$ energizes the corresponding electro-magnet 39. In consequence, the switch is reversed; the body 31 swings downward, breaking the set of contacts on the left (Fig. VII), and the body 32 swings upward, closing the set of contacts on the right. The circuit which by the further advance of combination stop 22 is established through lead $c$ is then established through the corresponding make-and-break device 42, 43, and through the corresponding lead $f$ on the right, Fig. VII. The corresponding electro-magnet 55 then is energized and the corresponding switch 56 is closed.

The closing of one of the switches 56 establishes an electric circuit from a source of electrical energy through each of the contact pieces 21 which are secured beneath the corresponding bar 44, and through one or the other of each of the pair of electro-magnets 9, 10. If the particular contact piece be held by bar 44 to one side of the slot, it will be the corresponding electro-magnet 9 which is energized; if the contact piece be held to the other side of the slot, it will be the electro-magnet 10 which is energized. The energizing of the electro-magnets 9 and 10 (one of each pair) will effect such swinging of bars 3 as will reestablish the combination. The release of the combination stop will effect the opening of the circuits and the deenergizing of the magnets, but the bars 3 will remain under spring tension in the positions to which they have been brought, and the particular combination will continue in effect until the organist voluntarily changes it.

When a combination stop is pulled out and released, the corresponding bar 44 captures the contact pieces 21 in an arrangement corresponding to the then existing combination. When thereafter that same combination stop is pressed in, the particular arrangement of the captured contact pieces is effective through magnets 9, 10, to reestablish the same combination.

We claim as our invention:

1. In mechanism for controlling the stops of a pipe organ, two lines of opposite pairs of contact pieces, a plurality of independently movable contact pieces extending one between each pair of the contact pieces first named and adapted by such movement to close contact alternately through one or the other of the contact pieces of the pair, a plurality of stop levers, a pair of electromagnets associated with each stop lever and adapted to move the stop lever, one to on position, the other to off position, and means for energizing one magnet of each pair or the other, according as one of the movable contact pieces is in contact-closing position with one or the other of the pair of contact pieces with which it is associated, together with means for securing the plurality of movable contact pieces in such contact-closing positions as at a given moment they may occupy.

2. The combination of claim 1, the means for securing the contact pieces being movable to and from operative position.

3. In mechanism for controlling the stops of a pipe organ, a plurality of double lines of opposite pairs of contact pieces, a plurality of independently movable carriers on each of which is borne a set of contact pieces, one contact piece of each set extending between a pair of the contact pieces first named, and adapted by the movement of the set to close contact alternately through one or the other of the contact pieces of the pair, a plurality of stop levers, a pair of electro-magnets associated with each stop lever and adapted to move the stop lever, one to on position, the other to off position, and means for establishing electrical leads to one magnet of each pair or the other, according as the movable contact pieces of one set are in contact-closing position with one or the other of the pairs of contact pieces with which they are associated, a plurality of independently movable means for securing one of the contact pieces of each movable set in contact-closing position with one of the opposite pairs of contact pieces with which it is associated, and means for simultaneously energizing one of the electro-magnets of each pair through one or another of the double line of contact pieces first named.

4. In mechanism for controlling the stops of a pipe organ, a slotted body, an abutment movable to and from a position of closure in such slot, opposite pairs of contact pieces borne by said slotted body and arranged along the sides of such slot, a plurality of bars arranged adjacent to said slotted body and independently movable in a direction transverse to such slot, and carrying each a contact piece which projects through the slot in the slotted body and between a pair of contact pieces borne thereby, a plurality of stop levers, a pair of electro-magnets associated with each stop lever and adapted to move the stop lever, one to on position, the other to off position, and means for energizing one magnet of each pair or the other, according as one of the bar-borne contact pieces is in contact-closing position with one or another of the pair of contact pieces with which it is associated.

5. In mechanism for controlling the stops of a pipe organ, a body slotted with a plurality of slots, a corresponding plurality of abutments independently movable to and from positions of closure in the several slots, opposite pairs of contact pieces borne by said slotted body and arranged along the sides of such slots, a plurality of bars arranged adjacent said slotted body and independently movable in a direction transverse to such slots and carrying each a plurality of contact pieces, one contact piece of each bar projecting through each of the slots in the slotted body and between a pair of contact pieces borne thereby, a plurality of stop levers, a pair of electro-magnets associated with each stop lever and adapted to move the stop lever, one to on position, the other to off position, and means for establishing electrical leads to one magnet of each pair or the other, according as the contact pieces of one bar-borne set are in contact-closing position with one or the other of the pairs of contact pieces with which they are associated, and means for simultaneously energizing one of the electro-magnets of each pair through the contact pieces arranged in one slot or another of the slotted body.

6. In mechanism for controlling the stops of a pipe organ, two lines of opposite pairs of contact pieces, a plurality of independently movable contact pieces extending one between each pair of the contact pieces first named and adapted by such movement to close contact alternately through one or the other of the contact pieces of the pair, a plurality of manually movable stop levers, a pair of electro-magnets associated with each stop lever and adapted to move the stop lever, one to on position, the other to off position, means for energizing one magnet of each pair or the other, according as one of the movable contact pieces is in contact-closing position with one or the other of the pair of contact pieces with which it is associated, and means for securing the plurality of movable contact pieces in such contact-closing positions as at any given moment they may occupy, the said movable contact pieces being responsive in their movement, each to the manual movement of one of said stop levers.

7. In mechanism for controlling the stops of a pipe organ, a plurality of double lines of opposite pairs of contact pieces, a plurality of independently movable carriers on each of which is borne a set of contact pieces, one contact piece of each set extending between a pair of the contact pieces first named, and adapted by the movement of the set to close contact alternately through one or the other of the contact pieces of each pair, a plurality of stop levers, a pair of electro-magnets associated with each stop lever and adapted to move the stop lever, one to on position, the other to off position, means for establishing electrical leads to one magnet of each pair or the other, according as the movable contact pieces of one set are in contact-closing position which one or the other of the pairs of contact pieces with which they are associated, a plurality of movable combination stops, and means associated with each combination stop and made effective by the movement thereof, for simultaneously energizing through one of the double line of contact pieces first named one of the electro-magnets of each pair.

8. The combination of claim 3, together with a plurality of combination stops each movable in two directions, the said means for securing the contact pieces being severally movable in response to the movement of the several combination stops in one direction, and the means for energizing the electro-magnets through the several lines of contact pieces being responsive to the movement of the several combination stops in the other direction.

9. In apparatus for operating a pipe organ, a manually movable stop lever including a pivoted bar terminating in an arc-shaped cross-arm whose center of curvature coincides with the center of pivoting of the bar, two electro-magnets associated with the stop lever with respect to both of which the cross-arm of the stop lever constitutes an armature, a combination stop, and means under the control of such combination stop for energizing selectively one of the said electro-magnets or the other.

10. In apparatus for operating a pipe organ, a vertically standing metallic frame, a metallic stop lever pivoted in said frame on one side and movable vertically on its pivot, such lever protruding beyond its pivot point through the frame in a manually accessible extension, a spring of metal pivoted in the said frame on its other side, and engaging the stop lever, its tension effective as the lever and spring swing in unison across a line of dead center to press the said lever alternately upward and downward, the said spring constituting a make-and-break device in a stop-operating electrical circuit, said frame being provided with abutments of insulating material, adapted to limit and define the range of movement of the stop lever.

11. The structure of claim 10, together with two electro-magnets arranged within the frame, with respect to both of which said stop lever constitutes an armature, and means for energizing selectively said electro-magnets.

12. In apparatus for operating a pipe organ, a combination stop member held normally in neutral position and movable oppositely in two directions against spring tension, a plurality of stop levers, stop-lever moving apparatus including a series of make-and-break devices, the said make-and-break devices being severally responsive to movements of the stop levers, means made operative by movement of the combination stop in one direction for securing the said make-and-break devices in such positions as, in consequence of the shifting of the stop levers, they may have assumed, and means made operative by movement of the combination stop in opposite direction and including said make-and-break devices for making effective said stop-lever moving apparatus.

13. In apparatus for controlling a pipe organ, the combination of a movable stop member, a bar movable longitudinally against spring tension, and means for effecting bar movement on the movement of said stop member, a body arranged adjacent said bar and slotted with a slot extending transversely to the direction of bar movement, said bar being provided with a flexible and elastic contact piece extending through the slot in said slotted body, electrical contact pieces borne by the said slotted body and arranged within and on opposite sides of such slot and adjacent the contact piece first named, the contact piece first named extending normally at one side of the slot or the other, according as the bar which carries it is in one or the other of its alternate positions, a pair of electro-magnets adapted when alternately energized to shift said stop member alternately to on and off positions, a combination stop movable alternately from an intermediate position in one direction or the other, an abutment movable against spring tension from normal position in said slot, means operative by movement of the combination stop in one direction to cause the said abutment to move out of said slot, an electrical circuit including a switch adapted to be completed through one of said electro-magnets or the other, accordingly as said flexible and elastic contact piece makes contact on one side of the slot or the other, and means operative by movement of said combination stop in opposite direction for closing said switch.

In testimony whereof we have hereunto set our hands.

ALFRED MOORHOUSE.
SAMUEL G. BOWMAN.